Figure 1:
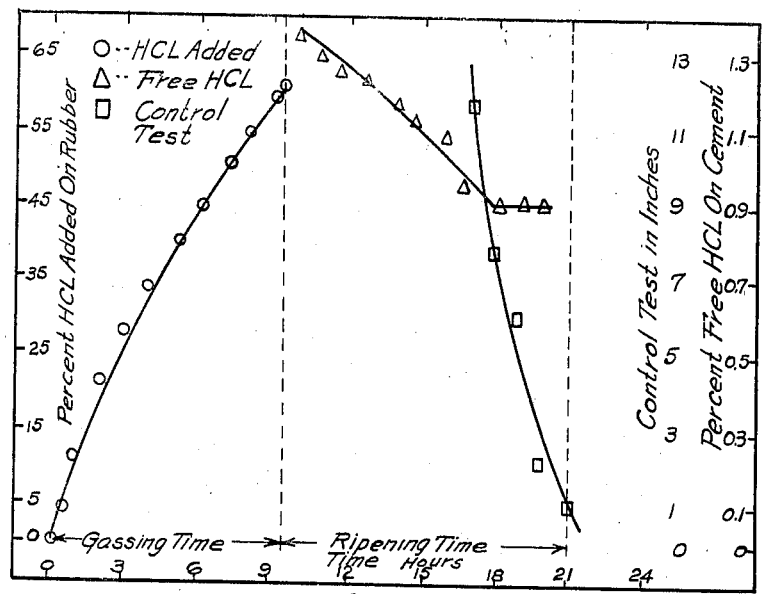

Dec. 6, 1938.  W. C. CALVERT  2,139,647

RUBBER HYDROCHLORIDE

Filed May 6, 1937

Inventor
William C. Calvert
By
Attorney

Patented Dec. 6, 1938

2,139,647

UNITED STATES PATENT OFFICE 2,139,647

RUBBER HYDROCHLORIDE

William C. Calvert, Chicago, Ill., assignor to Wingfoot Corporation, Akron, Ohio, a corporation of Delaware Application May 6, 1937, Serial No. 141,111
In Germany January 20, 1934

11 Claims. (Cl. 260—1)

This invention relates to rubber hydrochloride having particular properties which make it suitable for use in the manufacture of films, coating compositions, etc. The invention includes the new rubber hydrochloride and the method of preparing it.

It is old in the art to produce rubber hydrochloride by hydrochlorinating a solution of rubber and then allowing the hydrochlorinated solution to stand. While standing the hydrogen chloride acts upon the rubber. By introducing into the solution an excess of hydrogen chloride over that required for complete hydrochlorination of the rubber molecule and then allowing the solution to stand, after the chlorine content of the rubber hydrochloride has become substantially constant the properties of the rubber hydrochloride undergo a change. According to this invention rubber hydrochloride having desired physical properties is obtained by terminating the action of the hydrogen chloride at a desired point after the chlorine content of the rubber hydrochloride has become substantially constant. The action of the hydrogen chloride may be terminated in any desired way as by neutralization or steam distillation.

The nature of the solvent employed is not controlling. Rubber may be hydrochlorinated in solution in any suitable solvent such as chloroform or benzene etc. by introducing an excess of hydrogen chloride into the solution and then after hydrochlorination of the rubber to substantially constant chlorine content terminating the reaction to produce the desired rubber hydrochloride.

Any suitable test may be employed to determine when rubber hydrochloride of the desired properties has been obtained. It has been found satisfactory to sample the reacting cement, produce a film from the sample and then test the properties of the film and in this way determine when the reaction is to be terminated. Such a test can be completed in about one-half hour. Experienced operators can determine whether sufficient hydrochlorination has taken place by visual observation of the film and by handling it, wrinkling and pulling it, etc. A more exact determination may be made by testing the properties of the film with suitable apparatus. For example, by evaporating the solvent from a sample of the reacted cement a film is obtained which when suspended from one end with a weight attached to the other may be tested for elongation. For film purposes such elongation test has been found a most satisfactory method of determining when the desired rubber hydrochloride is produced. The rubber hydrochloride may be prepared as follows:

20 pounds of plasticized pale crepe rubber are dissolved in 313.3 pounds of benzene giving a rubber cement of approximately 6% concentration. Commercial benzene may be employed. The cement is cooled to about 50° F. and hydrogen chloride gas is then introduced with agitation of the cement. The rubber is gradually hydrochlorinated. During the hydrochlorination the temperature of the cement is maintained between 50 and 70° F. After passing the gas into the solution for about six hours the increase in weight of the composition will indicate the addition of approximately 11.6 pounds of hydrogen chloride which corresponds to an excess of available hydrogen chloride over that theoretically required by the empirical formula $(C_5H_9Cl)_x$.

The introduction of hydrogen chloride into the cement is then discontinued and the reaction mixture allowed to stand at a temperature of 50 to 70° F. The hydrogen chloride dissolved in the benzene of the cement reacts on the partially hydrochlorinated rubber until the desired change in the rubber hydrochloride has taken place. This is generally accomplished in five to twelve hours. The over-all time required for obtaining a rubber hydrochloride of the desired characteristics is generally not over about 20 hours. After the introduction of gas has been terminated and the hydrochlorination has proceeded toward completion the reacting cement is sampled from time to time, for example, every half hour. A film is prepared from the sample and examined or tested until the desired product is indicated and then the reaction is terminated in any suitable manner, as by neutralization or steam distillation as described in Calvert Patent No. 1,989,632. The rubber hydrochloride may then be worked up into a film as described in the patent. A photochemical inhibitor, plasticizers, dyestuffs, pigments, etc. may be added to the cement as desired to produce a film of desired characteristics.

Rubber hydrochloride suitable for the formation of films may be obtained by hydrochlorinating a rubber cement of about 6% concentration as described, sampling from time to time, and stopping the reaction 35 minutes after taking a sample which meets the following stretch test. The sample is spread on a smooth plate and is evaporated for 15 minutes at 158–160° F. to give a film .001 inch thick. After cooling for precisely ten minutes a piece of film three inches wide is suspended from one end and a 4½ pound weight is attached to the other. The weight is allowed to act on the film for five minutes at 75° F. When the stretch is between 1.4 and 1.6 inches as measured on an original six inch length the reaction is stopped, i. e. the reaction terminates 35 minutes after the taking of the sample giving this particular stretch. A film made from this rubber hydrochloride gives a desirable film. Test film with a stretch anywhere from one-half inch to 3½ inches gives satisfactory film, depending upon the purpose for which it is to be employed. The reaction can readily be controlled to any predetermined stretch within a range of ±¼ inch.

Although the process of hydrochlorination has been described more particularly in connection with the treatment of a benzene cement of rubber it may likewise be applied to cements of rubber made from other solvents such as chloroform, etc. In the hydrochlorination of rubber for the production of film the final stages of the hydrochlorination are advantageously carried out under substantially uniform conditions of temperature, etc. which cause the reaction to progress slowly and the reaction is terminated about one half hour after taking a sample which yields a film having predetermined properties. More rapid means of hydrochlorination will also allow of testing in the manner here described, since although the test requires about one-half hour for completion, the latter stages of the reaction are so uniform under controlled conditions, that for any determined stretch it is possible to forecast the time at which the desired characteristics will have been obtained.

The rate of the reaction during the latter stages of hydrochlorination, i. e. subsequent to the addition of the predetermined amount of hydrogen chloride into the cement is markedly dependent upon the amount of excess hydrogen chloride over that theoretically required for complete reaction with the rubber. The reaction may be speeded up by addition of a larger excess of hydrogen chloride than, for example, that given in the foregoing example.

Figure 2:
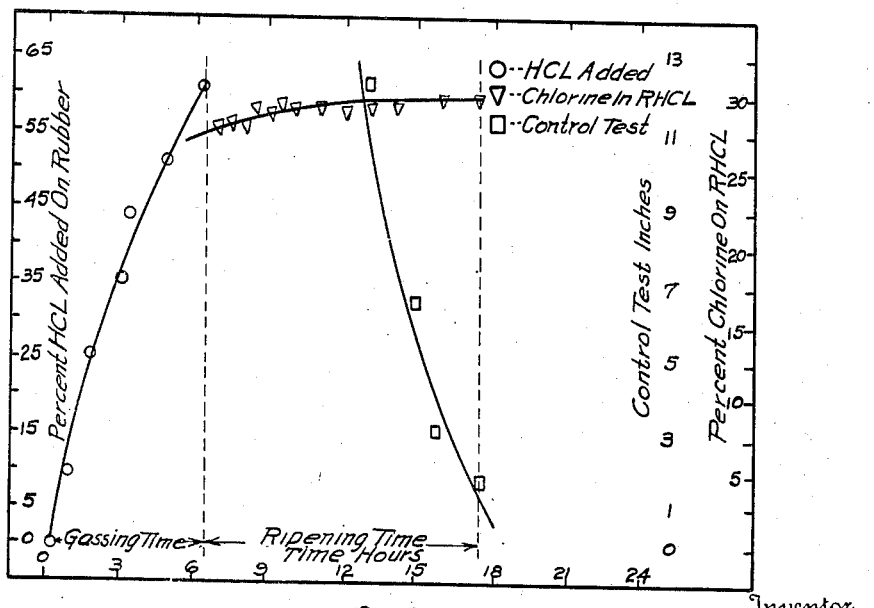

In the accompanying drawing Figures 1 and 2 show results obtained with different batches of rubber hydrochloride cement. The graphs are self-explanatory. In Fig. 1 the free hydrogen chloride in the cement is indicated whereas in Fig. 2 the chlorine in the rubber hydrochloride is indicated. Both graphs show the amount of hydrogen chloride added to the cement and the change in the properties of the rubber hydrochloride as indicated by the elongation test described above.

In making the graphs samples were obtained from the two batches of reacting cement at one-half hour or hour intervals. Benzene cements were used in both cases. To determine the free hydrogen chloride a 50 gram sample of the reacting cement was diluted with 100 cc. of benzene. The reaction was stopped by adding either (1) a mixture of 50 cc. of 0.5 N alcoholic NaOH and 20 cc. of neutral alcohol, or (2) 250 cc. of neutral alcohol. The samples thus obtained will be herein referred to as alkali-quenched and neutral-quenched samples, respectively.

After 24 hours of leaching the alkali-quenched samples were titrated with 0.5 N—HCl to determine the amount of free hydrogen chloride present in the cement.

The free acid was extracted from the neutral-quenched samples by leaching with three successive portions of 1:3 benzene in alcohol for several hours. This was followed by washing with 0.001 N—NaOH alcohol and a final washing with neutral alcohol. The final washing liquid was removed by suction and the samples were dried at 60° C. for 16 hours and then 45–50° C. for 48 hours.

The graphs were prepared from the following data:

Graph I

| Gassing period | | Ripening period | | |
| --- | --- | --- | --- | --- |
| Elapsed time | Percent HCl added on rubber | Elapsed time | Percent free HCl on cement | Control test in. stretch |
| 0 | 0 | 0 | | |
| 30 min. | 4.6 | 35 min. | 1.36 | |
| 1 hr. | 10.8 | 1 hr. 35 min. | 1.30 | |
| 2 hr. | 20.8 | 2 hr. 35 min. | 1.25 | |
| 3 hr. | 27.3 | 3 hr. 25 min. | 1.24 | |
| 4 hr. | 33.5 | 4 hr. 35 min. | 1.17 | |
| 5 hr. | 39.2 | 5 hr. 35 min. | 1.13 | |
| 6 hr. | 44.6 | 6 hr. 35 min. | 1.09 | |
| 7 hr. | 50.4 | 7 hr. 5 min. | 1.01 | |
| 8 hr. | 54.6 | 7 hr. 35 min. | 0.94 | 11.8 |
| 9 hr. | 59.2 | 8 hr. 5 min. | 0.90 | |
| 9 hr. 20 min. | 60.0 | 8 hr. 35 min. | 0.90 | 7.8 |
| | | 9 hr. 5 min. | 0.90 | |
| | | 9 hr. 35 min. | 0.90 | 6.1 |
| | | 10 hr. 35 min. | 0.89 | 2.3 |
| | | 11 hr. 35 min. | | 1.2 |

Graph II

| Gassing period | | Ripening period | | |
| --- | --- | --- | --- | --- |
| Elapsed time | Percent HCl added on rubber | Elapsed time | Percent chlorine on RHCl | Control test in. stretch |
| 0 | 0 | 0 | | |
| 40 min. | 10.0 | 48 min. | 27.61 | |
| 1 hr. 40 min. | 25.8 | 1 hr. 18 min. | 27.95 | |
| 2 hr. 40 min. | 36.2 | 1 hr. 48 min. | 27.83 | |
| 3 hr. 40 min. | 44.3 | 2 hr. 18 min. | 28.76 | |
| 4 hr. 40 min. | 51.6 | 2 hr. 48 min. | 28.57 | |
| 5 hr. 40 min. | 57.7 | 3 hr. 18 min. | 29.32 | |
| 6 hr. 22 min. | 61.1 | 3 hr. 48 min. | 29.13 | |
| | | 4 hr. 48 min. | 29.19 | |
| | | 5 hr. 48 min. | 28.82 | |
| | | 6 hr. 48 min. | 29.10 | Over 12 |
| | | 7 hr. 48 min. | 29.44 | |
| | | 8 hr. 48 min. | 29.32 | 6.4 |
| | | 9 hr. 48 min. | 29.69 | 3.1 |
| | | 11 hr. 3 min. | 29.58 | 1.55 |

In the drawing and tables the period following the "Gassing period" has been termed "Ripening period" for convenience. It is not known just when the ripening commences The change in physical properties of the film during the ripening period illustrated in the two graphs is remarkable. Although during the latter stages of the ripening period the addition of HCl to the rubber molecule, as shown by the chlorine content, has practically ceased, the product is still undergoing pronounced changes in physical characteristics. One change, that is quite apparent is evidenced by the alteration in the film forming properties of the rubber hydrochloride. For example, in the foregoing described control test, films spread from samples taken soon after the end of the gassing period could not be stripped from the glass surface on which they were formed. When the reaction has progressed to the point where a film becomes strippable, the product undergoes a progressive transition from being very tender and rubbery, and with a continuing decrease in the elongation finally it becomes horny and practically inextensible. This change in physical properties is apparently due to an increase in size of or a rearrangement in, the molecular aggregates of the rubber hydrochloride. The rubber hydrochloride obtained by terminating the reaction 35 minutes after a test sample gives an elongation of between 3½ inches and ½ inch, is free from tackiness and gives a film having desirable properties for many uses and when used as a coating composition is particularly adapted for moisture-proofing packaging material, etc. When used for either coating or for film purposes it may be plasticized with material such as butyl stearate, dibutyl phthalate, etc.

A photochemical inhibitor such as hexamethylene tetramine or other inhibitor mentioned in Calvert 1,989,632 may advantageously be employed.

This application is a continuation in part of my application Serial No. 83,161 filed June 2, 1936 which in turn is a continuation of my application 173 filed January 2, 1935.

I claim:

1. In the process of producing rubber hydrochloride by hydrochlorination of a rubber cement, the steps which comprise rapidly introducing into the cement an excess of hydrogen chloride over that required for theoretically complete chemical saturation of the rubber thereby effecting hydrochlorination of the rubber, then, after chemical addition of hydrogen chloride to the rubber has nearly ceased, allowing the rubber hydrochloride cement to ripen in the presence of the excess of hydrogen chloride without substantial change in the chlorine content of the rubber hydrochloride, and terminating the ripening process before it has gone to completion by neutralizing the hydrogen chloride.

2. The process of hydrochlorinating a benzene cement of rubber which comprises rapidly introducing into a benzene cement of rubber an excess of hydrogen chloride over that required for theoretically complete chemical saturation of the rubber thereby effecting hydrochlorination of the rubber, then, after chemical addition of hydrogen chloride to the rubber has nearly ceased, allowing the rubber hydrochloride cement to ripen in the presence of the excess of hydrogen chloride without substantial change in the chlorine content of the rubber hydrochloride, and terminating the ripening at a predetermined short time (the length depending upon the excess of free hydrogen chloride employed) after a sample tested as described herein gives a stretch of about one and one-half inches.

3. The process of hydrochlorinating a benzene cement of rubber which comprises rapidly introducing into a benzene cement of rubber an excess of hydrogen chloride over that required for theoretically complete chemical saturation of the rubber thereby effecting hydrochlorination of the rubber, then, after chemical addition of hydrogen chloride to the rubber has nearly ceased, allowing the rubber hydrochloride cement to ripen in the presence of the excess of hydrogen chloride without substantial change in the chlorine content of the rubber hydrochloride, and then by neutralizing the excess hydrogen chloride, terminating the ripening at a predetermined short time (the length depending upon the excess of free hydrogen chloride employed) after a sample tested as described herein gives a stretch of about three and one-half to one-half inches.

4. The process of producing rubber hydrochloride which comprises rapidly introducing into a benzene cement of rubber an excess of hydrogen chloride over that required for theoretically complete chemical saturation of the rubber thereby effecting hydrochlorination of the rubber, then, after chemical addition of hydrogen chloride to the rubber has nearly ceased, allowing the rubber hydrochloride cement to ripen in the presence of the excess of hydrogen chloride without substantial change in the chlorine content of the rubber hydrochloride, and terminating the ripening before gelation of the cement occurs.

5. In the process of producing rubber hydrochloride the steps which comprise ripening a cement of rubber hydrochloride of about 30% chlorine content in the presence of dissolved hydrogen chloride without substantial change in the chlorine content of the rubber hydrochloride and terminating the ripening of the hydrogen chloride before it has gone to completion by neutralizing the dissolved hydrogen chloride.

6. In the process of producing rubber hydrochloride the steps which comprise ripening a rubber hydrochloride cement in the presence of dissolved hydrogen chloride without appreciable change in the chlorine content of the rubber hydrochloride, and then terminating the ripening of the rubber hydrochloride before it has gone to completion by neutralizing the hydrogen chloride.

7. In the process of producing rubber hydrochloride the steps which comprise ripening a cement of a rubber hydrochloride of about 30% chlorine content in the presence of dissolved hydrogen chloride, and stopping the ripening by neutralizing the hydrogen chloride a short time after a sample tested as described herein gives a stretch of about three and one-half to one-half inches.

8. In the production of rubber hydrochloride the steps which comprise causing a rubber hydrochloride in cement form to stand in the presence of dissolved hydrogen chloride of such concentration that there is no rapid change in the chlorine content of the rubber hydrochloride, thereby ripening the rubber hydrochloride without substantial change in its chlorine content, and then terminating the ripening process before it has gone to completion.

9. Rubber hydrochloride produced by the process of claim 8.

10. In the production of rubber hydrochloride the steps which comprise causing a rubber hydrochloride in cement form to stand in the presence of dissolved hydrochloride of such concentration that there is no rapid change in the chlorine content of the rubber hydrochloride, thereby ripening the rubber hydrochloride without substantial change in its chlorine content, sampling and testing the cement from time to time during the ripening process for changes in physical character and then terminating the ripening process before it has gone to completion when a test sample indicates the rubber hydrochloride has attained the desired physical character.

11. In the process of producing rubber hydrochloride the steps which include hydrochlorinating a rubber cement in the presence of dissolved hydrogen chloride in excess of the amount required for theoretically complete chemical saturation of the rubber, and after chemical addition of hydrogen chloride to the rubber has ceased gradually changing the physical character of the rubber hydrochloride by causing the same to stand and ripen in the presence of the excess hydrogen chloride in the cement, testing samples of the rubber hydrochloride from time to time during the ripening process for changes in physical character, and terminating the ripening process short of completion to prevent further change in the physical character of the rubber hydrochloride by neutralization of the hydrogen chloride when a test sample indicates the rubber hydrochloride has attained the particular physical character desired.

WILLIAM C. CALVERT.